United States Patent [19]

Araujo et al.

[11] Patent Number: 5,625,427
[45] Date of Patent: Apr. 29, 1997

[54] OPHTHALMIC LENS

[75] Inventors: Roger J. Araujo, Horseheads; Nicholas F. Borrelli, Elmira; Josef C. Lapp; David W. Morgan, both of Corning, all of N.Y.

[73] Assignee: Corning Incorporated, Corning, N.Y.

[21] Appl. No.: 294,636

[22] Filed: Aug. 23, 1994

Related U.S. Application Data

[63] Continuation-in-part of Ser. No. 166,833, Dec. 15, 1993, Pat. No. 5,430,573.

[51] Int. Cl.$^6$ .................. G02C 7/02; C03C 15/00
[52] U.S. Cl. .................. 351/159; 65/30.11; 65/32.3; 351/163
[58] Field of Search .................. 351/163; 65/30.1, 65/30.11, 32.1, 32.3, 33.3

[56] References Cited

U.S. PATENT DOCUMENTS

| | | | |
|---|---|---|---|
| 3,325,299 | 6/1967 | Araujo | 106/52 |
| 3,540,793 | 11/1970 | Araujo et al. | 350/147 |
| 3,653,863 | 4/1972 | Araujo et al. | 65/30 |
| 3,954,485 | 5/1976 | Seward, III et al. | 106/47 Q |
| 4,304,584 | 12/1981 | Borrelli et al. | 65/30.11 |
| 4,339,256 | 7/1982 | Simms | 65/32 |
| 4,405,692 | 9/1983 | Araujo et al. | 428/68 |
| 4,479,819 | 10/1984 | Borrelli et al. | 65/30.11 |
| 5,281,562 | 1/1994 | Araujo et al. | 501/32 |
| 5,322,819 | 6/1994 | Araujo et al. | 501/13 |
| 5,430,573 | 7/1995 | Araujo et al. | 359/361 |

FOREIGN PATENT DOCUMENTS 4-279337  9/1992  Japan .

Primary Examiner—Georgia Y. Epps
Assistant Examiner—Jordan M. Schwartz
Attorney, Agent, or Firm—Milton M. Peterson

[57] ABSTRACT

An ophthalmic lens of photochromic glass having an $R_2O$-$Al_2O_3$-$B_2O_3$-$SiO_2$ base glass composition and a method of producing the lens. The lens contains precipitated cuprous halide crystals that are elongated and oriented, whereby the lens is capable of polarizing light when the lens is in the darkened state. If at least a portion of the crystals in at least a surface layer on the lens are reduced to copper metal, the lens exhibits a permanent dichroic behavior. The lens provides effective polarization of radiation across the entire visible wavelength region of the spectrum, has a sharp spectral cutoff for radiation below the 400 nm wavelength, thereby eliminating UV transmission, and has a transmittance not over about 40% in the darkened state.

7 Claims, 3 Drawing Sheets

FIG. 3
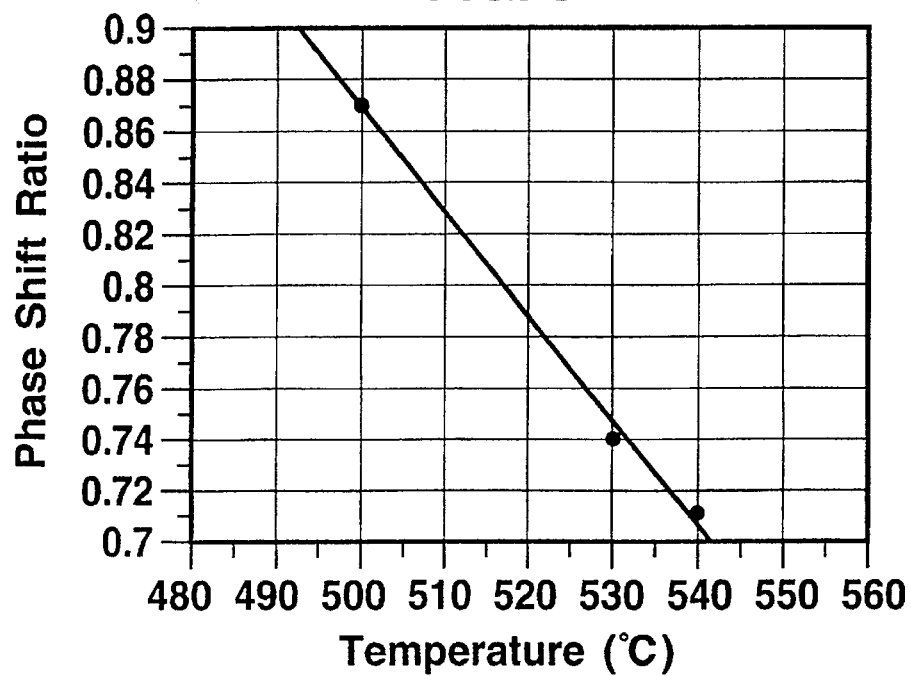
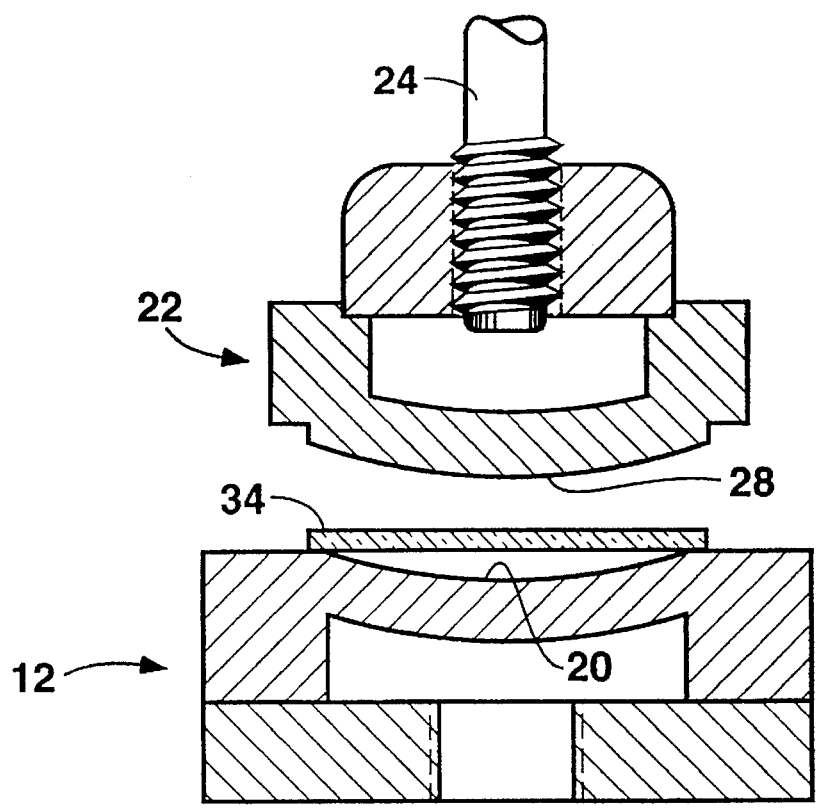
FIG. 5

OPHTHALMIC LENS

This application is a Continuation-in-part application of Ser. No. 08/166,833 filed Dec. 15, 1993, and issued Jul. 4, 1995 as U.S. Pat. No. 5,430,573.

FIELD OF THE INVENTION

An ophthalmic lens of a photochromic glass that absorbs ultraviolet radiation, is polarizing and has cuprous halide crystals precipitated in the glass.

BACKGROUND OF THE INVENTION

Photochromic glasses, based on silver halide crystals, can be rendered polarizing, by thermally softening and stretching the softened glass. This elongates the silver halide crystals and generates a form birefringence in the glass. A permanent polarizing effect can be obtained by heat treating the stretched glass in a reducing atmosphere. The elongated silver halide crystals are at least partially chemically reduced to elongated particles of metallic silver.

Glass polarizers, produced from silver halide-containing glasses as just described, have enjoyed commercial success in applications employing radiation in the infra-red portion of the spectrum. However, the parallel and perpendicular absorption curves reverse in magnitude and cross over in the visible wavelength region at about 480 nm. This has prevented the silver halide glasses from being considered the use as a visible polarizer, that is, for applications that require polarization in the same direction across the entire visible wavelength region of the spectrum. As used in this application, the term "visible polarizer" means a polarizer that provides effective polarization of radiation across the entire visible wavelength region of the spectrum. This is essentially the wavelength range of 400–700 nm.

U.S. Pat. No. 3,325,299 (Araujo) discloses phototropic (now known as photochromic) glasses in which copper and/or cadmium halide crystals are precipitated to impart photochromic behavior. The disclosed glasses have $R_2O$-$Al_2O_3$-$B_2O_3$-SiO base compositions. These oxides total at least 85% of the glass composition. Copper and/or cadmium oxides, together with sufficient chlorine, bromine and/or iodine to react stoichiometrically with at least 0.3% copper and/or cadmium, are added to the base glass composition.

The family of glasses containing a cuprous and/or cadmium halide crystal phase are strongly absorbing in the ultraviolet region of the radiation spectrum. This is due to a sharp spectral cut-off of radiation at wavelengths shorter than about 400 nm. This is also in contrast to the photochromic glasses containing silver halide crystals as their active element. Such glasses do not have a sharp cutoff.

Cadmium is not required to secure absorption of ultraviolet radiation, and imparts no exceptional benefit to the glass. The halide crystals are effective to absorb ultraviolet radiation, but cadmium is known to be extremely toxic. Accordingly, its presence is severely restricted, and it is preferably completely avoided. Therefore, while cadmium halide glasses are within the scope of the present invention, reference throughout will be to copper halide glasses.

Copending application Ser. No. 08/270,052, now U.S. Pat. No. 5,517,356, and is also a continuation-in-part of Ser. No. 08/166,833. That Patent is directed to a glass polarizer that provides effective polarization of radiation across the entire visible wavelength region the spectrum. The glass is an $R_2O$-$Al_2O_3$-$B_2O_3$-$SiO_2$ glass containing copper halide crystals. To produce the desired polarizing effect, copper halide crystals are precipitated in the glass, after which the glass is thermally softened and stretched. This also elongates and orients the crystals. Subsequently, the glass is fired in hydrogen to at least partially reduce the copper halide to metallic copper.

Heretofore, polarizers useful across the entire visible wavelength region of the spectrum, that is, 400–700 nm, have been produced from plastic materials. The disadvantages of such materials are well known. They cannot withstand elevated temperatures, scratch easily, bleach under intense light, and may undergo distortion under pressure.

It would be desirable to embody these visible polarizing and UV-absorbing characteristics in an ophthalmic lens. The present invention meets that need. It makes available an ophthalmic lens of photochromic glass that provides effective polarization across the entire visible wavelength portion of the spectrum. The glass lens has a sharp cutoff in transmission at about 400 nm, which removes harmful ultra-violet rays. This is of particular value in sunglasses to protect the eyes. The invention further provides a method of producing such a lens from glasses containing copper halide crystals.

SUMMARY OF THE INVENTION

The article of the invention is an ophthalmic lens of photochromic glass having an $R_2O$-$Al_2O_3$-$B_2O_3$-$SiO_2$ base glass composition, the lens containing precipitated cuprous halide crystals that are elongated and oriented, whereby the lens, in the darkened state, exhibits a dichroic behavior and provides effective polarization of radiation across the entire visible wavelength region of the spectrum, the lens having a sharp spectral cutoff for radiation below the 400 nm wavelength, thereby eliminating UV transmission, the lens having a transmittance not over about 40% in the unfaded state.

The invention further resides in a method of making an ophthalmic lens which comprises precipitating cuprous halide crystals in a photochromic glass containing copper and halogen ions in an $R_2O$-$Al_2O_3$-$B_2O_3$-$SiO_2$ base glass composition, applying a stretching force to the glass to elongate the glass and to elongate and orient the precipitated crystals, thereby rendering the glass polarizing in the darkened state, forming a lens blank from the glass and positioning the blank on a mold, maintaining the glass blank at a temperature such that the glass has a viscosity in the range of $10^9$ to $10^{11}$ Mp·a—($10^{10}$–$10^{12}$ poises), applying a progressively increasing three to the upper surface of the blank until the blank conforms to the mold, thereby forming a lens.

DESCRIPTION OF THE DRAWING

FIG. 3 is a graphical representation of the relationship between birefringence and temperature in an elongated glass.

FIG. 5 is an enlarged view in cross-section of a portion of the mold apparatus of FIG. 4.

PRIOR ART

Figure 1:
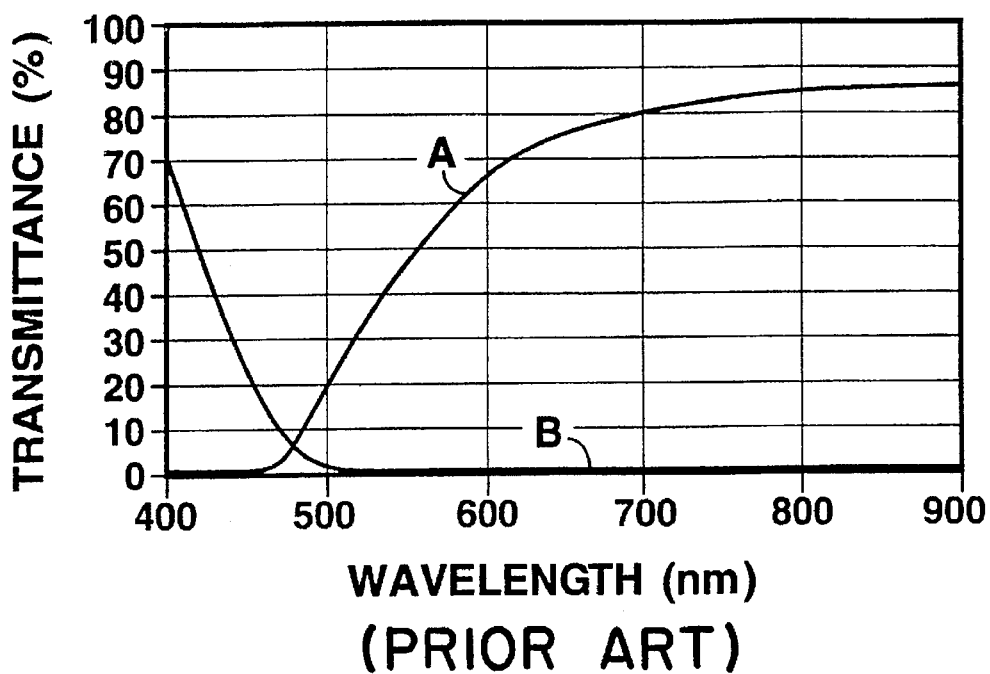
FIGS. 1 and 2 in the drawing are graphical representations of transmission curves for (1) light polarized by an article in accordance with the prior an and (2) light polarized by an article in accordance with the invention.

Documents of possible interest, in addition to those described in the Background section, are listed in a separate document.

DESCRIPTION OF THE INVENTION

The article of the present invention is an ophthalmic lens that is rendered photochromic by precipitation of a cuprous halide crystal phase in the glass. The lens is particularly useful as a sunglass lens.

The basic purpose of a sunglass lens is to reduce the light level and the glare from bright sunlight. Recently, however, considerable attention has also been directed to the harmful effects of ultraviolet (UV) radiation on humans, especially the effect of such radiation on the eye. Accordingly, it is also desirable that an ophthalmic lens, and particularly a sunglass lens, strongly absorb UV radiation.

A photochromic glass darkens in response to activating radiation, and fades with removal of that radiation. In glass, the activating radiation is in the near UV range. The degree of darkening varies with the intensity of the activating radiation and with the time of exposure to that radiation.

Commercially important photochromic glasses have been derived from a glass family described in U.S. Pat. No. 3,208,860 (Armistead et al.). These glasses are characterized by having a precipitated, microcrystalline, silver halide phase. Lenses produced from such glasses are well known under the registered trademarks PHOTOGRAY, PHOTOGRAY EXTRA and SERENGETI.

As noted earlier, photochromic glasses containing a cuprous halide crystal phase have been described by Araujo in U.S. Pat. No. 3,325,299. These glasses have not developed the commercial significance of the glasses having silver halide crystals as their photochromic medium. Nevertheless, the cuprous halide glasses have certain attributes that are not available in the silver halide glasses, and that render them valuable for various uses.

The cuprous halide, photochromic glasses described by Araujo have an $R_2O$-$Al_2O_3$-$B_2O_3$-$SiO_2$ base glass composition, and contain cuprous ions and a halogen other than fluorine. The family of glasses taught in the patent consist essentially of, in weight percent: 40–75% $SiO_2$, 4–26% $Al_2O_3$, 4–26% $B_2O_3$, at least one alkali metal oxide in the indicated proportion selected from the group consisting of 2–8% $Li_2O$, 4–15% NaO, 6–20% $K_2O$, 8–25% $Rb_2O$ and 10–30% $Cs_2O$, 0.3–10% of at least one metal selected from the group consisting of copper and cadmium, and a total amount of halogen selected from the group consisting of chlorine, bromine and iodine sufficient to stoichiometrically react with at least 0.3% total of the metal, the sum of these constituents being at least 85% of the glass composition.

The development of photochromic properties involves thermal treatment of a member of the glass family to from and precipitate cuprous halide crystals in the glass. The Araujo patent is incorporated by reference for further information regarding precipitation of the crystal phase and the development of photochromic properties.

A glass having a precipitated, cuprous halide crystal phase has a sharp cutoff for transmission of radiation at wavelengths below 400 nm. This means that harmful UV radiation is essentially completely absorbed by the glass. The sharp UV cutoff is the result of an exciton band of the cuprous halide microphase that can be controlled by either composition or by thermal treatment.

The present invention arose during investigation of polarizing characteristics in glasses containing a cuprous halide crystal phase. The investigation revealed that unique polarizing effects, that extend across the entire visible wavelength range (400–700 nm), can be obtained in such glasses. These effects are achieved by elongation of the crystals in the glass, optionally followed by a thermal reduction treatment.

It was discovered that, after a photochromic glass containing cuprous halide crystals is elongated, the glass exhibits dichroic behavior in the darkened state. Thereby, the glass is rendered capable of polarizing light.

The dichroic behavior, and consequent polarizing property, are temporary in that they disappear when the glass fades to an undarkened state. This temporary effect is of particular value when a single article of ophthalmic ware is worn indoors and outdoors without change. Thus, the polarizing effect is present outdoors where it is needed. Then, it disappears when the glass lades indoors to produce an undarkened, non-polarizing lens.

The dichroic behavior, and consequent polarizing property, can be rendered permanent if desired. Then, the behavior is essentially the same whether the glass is darkened or faded. The dichroic behavior is rendered permanent by subjecting the elongated glass to a thermal reduction treatment.

The polarizing effects are induced by placing a bar of glass under unidirectional stress at an elevated temperature. This elongates the glass bar, and, consequently, the cuprous halide crystals contained therein. The elongated crystals may then be subjected to a thermal reduction treatment. This treatment at least partially reduces the cuprous halide crystals within a thin surface layer on the glass to the metallic state. The term "thermal reduction" refers to a chemical reduction of a copper ion to the metallic state in a cuprous halide crystal in glass while the glass is heated at an elevated temperature.

In silver halide glasses, it is desirable to conduct the thermal reduction at a temperature above 400° C. to maximize the polarizing behavior. This condition is also found to be desirable with the present copper halide glasses, although temperatures as low as 350° C. may suffice. While any reducing atmosphere may be employed, we prefer to employ hydrogen. This achieves the desired degree and depth of reduction in a reasonable time.

Quite unexpectedly, however, it was found that light polarized by a copper halide glass differed in a very significant aspect from light polarized by a stretched silver halide glass. The difference is seen in the transmittance curves for the parallel polarized light and the perpendicularly polarized light in the two systems.

In the silver halide system, transmittances measured perpendicular to the stretch axis are stronger than those measured parallel to that axis at long wavelengths, but they are weaker at shorter wavelengths.

This is illustrated in FIG. 1 of the accompanying drawing. In that FIGURE, transmittance values are plotted in percent on the vertical axis. Wavelengths are plotted on the horizontal axis in nm.

The data plotted in FIG. 1 were measured on a glass bar containing silver halide crystals. The glass bar was heat treated for 75 minutes at 725° C. to develop the silver halide crystal phase, and then stretched to elongate the crystals. The stretched bar was then fired in hydrogen for 48 hours at 410° C. This partially reduced the silver halide crystals in a surface layer to metallic silver, thereby rendering the glass polarizing.

This practice is in accordance with that described in U.S. Pat. Nos. 4,304,584 and 4,479,819, noted earlier. Accordingly, those patents are incorporated by reference to the extent necessary for comparative purposes.

The curve labeled A represents transmittance values for light polarized perpendicular to the stretch axis of the glass. This is the axis of the stretched silver halide crystals. The curve labeled B represents transmittance values for light polarized parallel to the stretch axis.

It will be observed that curves A and B cross at about 480 nm. This feature renders the silver halide glasses unsatisfactory for producing a light polarizer that is effective across the entire range of 400–700 nm.

Figure 2:
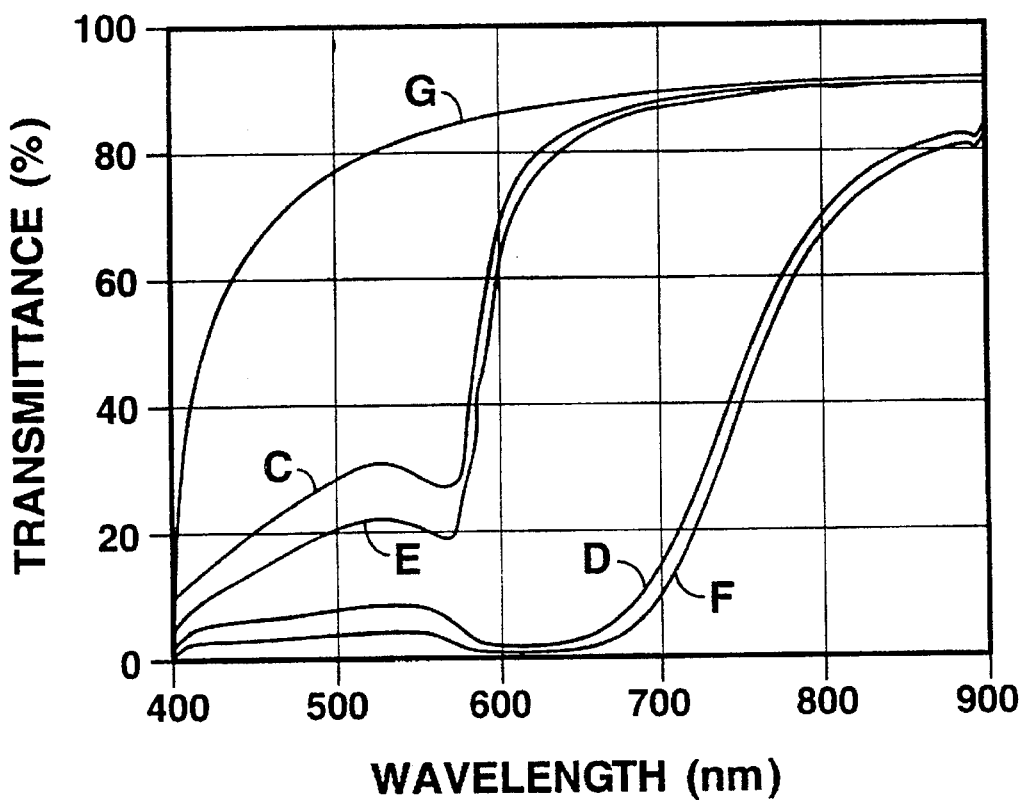

FIG. 2 in the drawing is also a graphical representation of transmittance curves for polarized light. As in FIG. 1, transmittance values are plotted in percent along the vertical axis. Wavelengths from 400–900 nanometers (nm) are plotted along the horizontal axis.

FIG. 2 exhibits the transmittance curves for light polarized by a typical copper halide crystal-containing glass in accordance with the present invention. Two molded glass bars were heat treated at 700° C. to develop a copper halide crystal phase. A stress of 20.7 $MP_2$ (3000 psi) was applied to stretch the glass bars to a thickness of about 0.8 min. The crystals also were elongated in the process. At this point, the stretched photochromic glass bars exhibited dichroic behavior in the darkened state, and were capable of polarizing light when in that state.

To render the dichroic behavior and light polarizing property permanent, the bars were fired at 410° C. in a hydrogen atmosphere. One bar was fired for 2.5 hours; the other for 4.5 hours. These treatments at least partially reduced copper halide crystals in a surface layer to metallic copper.

In FIG. 2, Curves C and D are based on measurements made on the bar tired for 2.5 hours. Curves E and F are based on measurements made on the bar fired for 4.5 hours. Curve G is the transmittance curve for the glass before firing in hydrogen. Measurements were made on a Hitachi U4001 spectrophotometer.

In FIG. 2, Curves C and E are the transmittance curves for visible light polarized perpendicular to the axis of the stretched crystals. Curves D and F are the transmittance curves for light polarized parallel to the axis of the stretched crystals.

It will be observed that curves C and E do not cross their respective counterparts D and F at any point. This means that light polarized perpendicular to the crystal will be transmitted more strongly than light polarized parallel at all wavelengths across the visible and near infra-red portions of the spectrum. This is a key distinction between glasses that contain copper halide or silver halide crystals, and that have been stretched and reduced to become polarizing. It is due, in part, to the fact that the interband absorption contribution to the optical dielectric constants is negligible for silver. However, it makes an important contribution to the optical constants of copper below 500 nm.

Observation of this unique feature of the copper chloride glasses led to the concept of producing a glass polarizer having the properties necessary for use with visible light across the entire 400–700 nm region.

A further interesting feature of glasses containing copper chloride crystals is their sharp cutoff for transmission of radiation at wavelengths below 400 nm. This means that ultra-violet radiation is essentially completely absorbed. This feature, together with the polarizing capability in the 400–700 nm region, led to the concept of an ophthalmic lens blank having a unique combination of photochromic, polarizing and UV-absorbing properties.

Certain conditions are essential to produce a photochromic glass having a cuprous halide crystal phase. The base glass must be an $R_2O$-$Al_2O_3$-$B_2O_3$-$SiO_2$ glass. In addition, it is necessary to provide, in the glass batch, a source of copper, as well as a source of halogen selected from chlorine, bromine, and iodine. To produce the present polarizing glass, the following additives, in weight percent based on the glass, are considered desirable: 0.4–1.0% $Cu_2O$, 0.4–1.0% SnO, and a halogen selected from 0.25–1.0% Cl, 0.25–1.0% Br and 0.25–1.5% Cl+Br.

The crystal phase may be precipitated in the glass as a formed article is cooled. However, it is generally desirable to cool the glass rapidly, thereby avoiding crystal development. Then, the glass may be reheated to precipitate the cuprous halide crystal phase. To this end, the glass is heated above its strain point, but below about 900° C. Generally a temperature in the range of 650°–850° C. is preferred for this purpose, although temperatures in the range of 500°–900° C. are contemplated.

To provide cuprous halide crystals in the glass, the glass composition requires at least 0.2 weight percent cuprous oxide ($Cu_2O$), preferably at least 0.4%. Up to about 2% $Cu_2O$ may be employed, but cuprous ions tend to disproportionate into cupric ions and neutral atoms at such higher levels. Therefore, the preferred maximum $Cu_2O$ content is about 1.0% by weight. The cuprous ion imparts no visible color to the glass, whereas the cupric ion generally provides a blue-green color.

The oxidation state of the copper is influenced by the temperature at which the glass batch is melted, by the partial pressure of oxygen to which the molten batch is exposed, by the concentration of polyvalent ions in the glass, and by the basicity (the R-value) of the glass. The oxides of arsenic, antimony and tin are illustrative of polyvalent metal oxides that are especially useful since they do not directly impart color to the glass.

Chlorine or bromine must be present to combine with the copper to form the necessary cuprous halide crystal phase. Iodine is also effective, but is not normally employed. The inclusion of fluorine may be useful, but it does not produce cuprous halide crystals in the absence of chlorine or bromine.

A particularly significant control factor is the R-value, a measure of the basicity of a glass. This value is expressed in cation % on an oxide basis as calculated from the formula:

$$R = \frac{M_2O + 2MO - Al_2O_3 - ZrO_2}{B_2O_3}$$

$M_2O$ designates alkali metal oxides, and MO represents alkaline earth metal oxides. Cuprous halide crystals can be developed in glasses with R-values below 0.15. Nevertheless, the development is slow, there is no substantial advantage in these glasses, they tend to be difficult to melt and they have poor chemical durability. Glasses with an R-value greater than 0.30 do not provide the desired crystal phase, except under certain compositional conditions. Glasses with a value over 0.45 are not suitable under any condition. Glasses with an R-value of about 0.25 are generally optimal for the development of a cuprous halide crystal phase. The approximate ranges, as calculated from glass batches in weight percent, and in terms of oxides and halogens, for photochromic glass compositions based on cuprous chloride crystals are:

| | | | |
|---|---|---|---|
| SiO$_2$ | 40–75% | Cu$_2$O | 0.2–2% |
| B$_2$O$_3$ | 4–26% | CdO | 0–2% |
| Al$_2$O$_3$ | 4–26% | SnO$_2$ | 0–2.5% |
| Li$_2$O | 0–8% | As$_2$O$_3$ + Sb$_2$O$_3$ | 0–2% |
| Na$_2$O | 0–15% | Cl | 0–2% |
| K$_2$O | 0–20% | Br | 0–2% |
| Li$_2$O + Na$_2$O + K$_2$O | 2–20% | Cl + Br | 0.25–2.0% |
| CaO + BaO + SrO | 0–10% | F | 0–2% |
| | | R-value | 0.15–0.45 |

TABLE I below sets forth some typical photochromic glass compositions in terms of oxides and halogens. These compositions are calculated from the glass batch in parts by weight approximating 100. It will be appreciated that up to 25% of the copper, and up to as much as 60% of the halogen content, may be lost during melting of the batch.

TABLE I

| | 1 | 2 | 3 | 4 | 5 | 6 |
|---|---|---|---|---|---|---|
| SiO$_2$ | 58.3 | 55.2 | 58.4 | 57.7 | 59.2 | 59.5 |
| Al$_2$O$_3$ | 9.0 | 12.0 | 9.0 | 9.0 | 9.5 | 11.4 |
| B$_2$O$_3$ | 20.0 | 20.0 | 20.0 | 20.0 | 20.1 | 17.4 |
| Na$_2$O | 10.1 | 10.0 | 10.0 | 10.0 | 4.4 | 5.7 |
| F | 1.4 | 0.7 | 1.2 | 1.5 | — | — |
| Cl | 0.9 | — | 0.9 | 0.9 | 0.5 | 0.5 |
| Br | — | 1.5 | — | — | 0.5 | 0.5 |
| Cu | 0.5 | 0.3 | 0.5 | 0.9 | 0.4 | 0.58 |
| Cd | — | 0.3 | — | — | — | — |
| Li$_2$O | — | — | — | — | 1.9 | 2.0 |
| K$_2$O | — | — | — | — | 2.9 | 1.5 |
| SnO$_2$ | — | — | — | — | 0.5 | 0.66 |

The availability of a photochromic glass blank that absorbs UV radiation below 400 nm, and that is polarizing across the entire visible wavelength portion of the spectrum, left open a problem of how to form a lens from the blank. For sunglass purposes, a lens blank must be reformed to a curved shape having an approximate 75 mm (3') diameter and a 6 diopter curvature.

The usual procedures in producing sunglass lenses cannot be used to form the present lens. At the temperatures involved, the crystal elongation would degrade to too great an extent. This degrading is a consequence of the elongated halide particles respheriodizing in the softened glass.

FIG. 3 illustrates the effect on birefringence that results tram increasing temperature. In that FIGURE, temperature, in °C., is plotted on the horizontal axis. The ratio of phase shift due to birefringence is plotted on the vertical axis. The ratio of phase shift is the ratio of the birefringence in a glass sample after reheating ($B_1$), as compared to the initial birefringence induced in the sample by stretching and hydrogen-firing ($B_0$). The ratio is then $B_1/B_0$.

As the reheat temperature is increased, the glass sample softens, that is, its viscosity decreases. Consequently, the elongated crystal phase tends to respheriodize, the birefringence decreases, and the phase shift ratio decreases. It is apparent that, if the glass is heated to its softening point (about 660° C.), the glass would completely respheriodize, and the birefringence would be completely lost.

Any reshaping procedure must involve heating a glass to some extent. It is evident from FIG. 3 that some loss will occur regardless of procedure. Consequently, any reshaping method selected must occur at as low a temperature as possible. This, in turn, means employing a high viscosity in the range of $10^9$ to $10^{11}$ Mp·a ($10^{10}$–$10^{12}$ poises). A further aspect of the invention is a method of imparting a curvature to a lens blank at a relatively low temperature that minimizes loss of birefringence.

Figure 4:
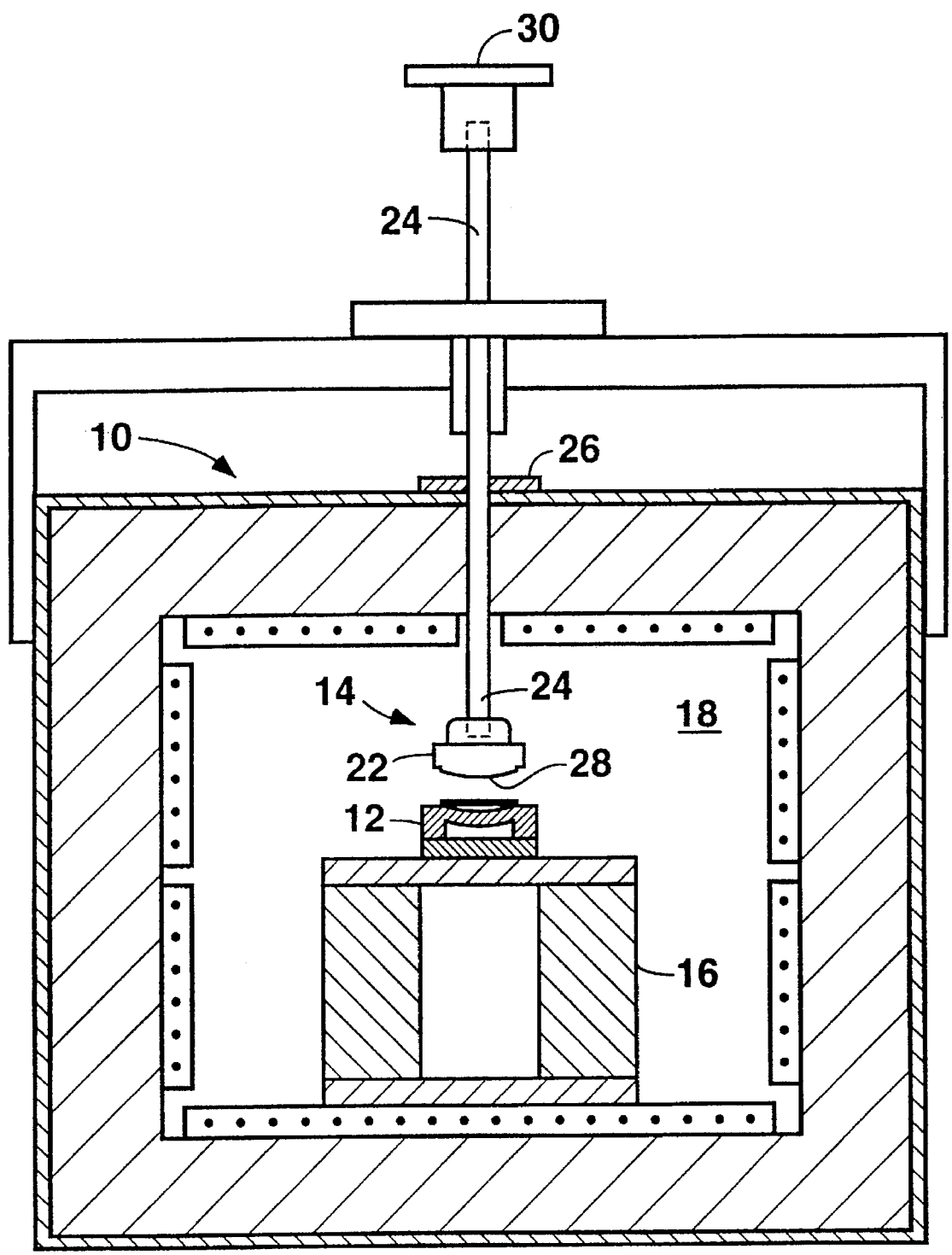
FIG. 4 is a side view in cross-section of a molding apparatus in accordance with the invention.

The method that we have devised is repressing by a modified plunger and mold technique. In this method, a load or force is applied to a lens blank. The load is slowly increased as the glass, at a relatively high viscosity, moves into a mold. FIG. 4 in the accompanying drawing is a side view in cross-section illustrating the principle involved. The FIGURE shows a pressing assembly generally designated 10. Assembly 10 comprises a lens die member 12 and a lens plunger 14.

Die 12 is firmly attached to a base 16. Base 16 is mobile to permit movement in and out of a heating chamber 18. Die 12 has an upwardly facing, concave surface 20 having a prescribed diopter curvature. For sunglasses, this will normally be about a 6 diopter curvature.

Lens plunger 14 has a presshead 22 carried on a vertical rod 24. Rod 24 extends out through the top of chamber 18 and a stop member 26. Presshead 22 has a convex thee 28 with a diopter curvature corresponding to, but the reverse of, that of die 12.

Plunger 14 may be operated in various ways. However, FIG. 4 shows rod 24 having a load platform 30 affixed to its upper end.

FIG. 5 is an enlarged partial view of FIG. 4 to better show the mode of operation. It shows only presshead 22 and die 12.

In operation, a flat lens blank 34, cut to prescribed size and shape, is placed across the upper face 20 of die 12. The die and blank assembly is moved into chamber 18 at operating temperature, for example, 540° C. Presshead 22 is then lowered in any known manner to contact lens blank 34. Constantly increasing pressure is then applied to presshead 22 through rod 24. This pressure may be applied by mechanically loading platform 30 with weights. Alternatively, a lever arrangement may be employed for hand operation. A threaded screw arrangement may also be used, as may pneumatic or hydraulic pressure devices for automatic operation.

In an experiment to test the equipment, a circular disk 34 was cut from a flat sheet of a photochromic, elongated glass. The disk was 5¼ cms (2¹⁄₁₆") diameter and 0.5 mm (0.02') thick. Lens die 12 was placed in a furnace at 530° C. and heated to a temperature of about 520° C. Disk 34 was placed over lens die 12 and plunger 14 lowered against disk 34. A lever arrangement was used to apply an ultimate force of 199 Kgs (90.5 lbs.) over a period of 30 seconds. A 6.25 diopter curvature was obtained without an undue loss of birefringence which is indicative of subsequent polarizing behavior. The viscosity of the glass at forming temperature was $4 \times 10^{10}$ Mp·a ($4 \times 10^{11}$ poises).

We prefer to use a somewhat more sophisticated, and more easily controlled, piece of equipment. This equipment embodies a modified centrifugal forming technique. Centrifugal forming employs a combination of centrifugal force and temperature to cause glass to sag into a mold.

In our modified process, a lens blank, such as 34, is placed over a centrifugal mold in the manner shown in FIG. 4. Then, a former, which may be a former having a 6 diopter face curvature, is placed on the face of the glass blank opposite to the mold face. The former is the equivalent of presshead 22. Like presshead 22, it will have a convex face corresponding to the mold surface, but the reverse thereof. As the centrifugal mold is activated, and its speed increased; the effective weight, and hence the force exerted, also increase.

In a typical operation of the method, a flat glass lens blank was placed within a mold having a 6 diopter curvature. The glass was a photochromic glass having a softening point of 662° C. It was rendered birefringent by stretching. The lens blank was 65 mm in diameter and 2 mm thick.

Four 6 diopter formers, having a total weight of about 170 grams, were placed on top of the glass lens blank. The assembly was introduced into a furnace operating at 540° C. Rotation of the assembly was initiate, and the rotation speed gradually increased over a 30 minute period.

TABLE II shows the time in minutes; the increasing revolutions per minute (RPM); and the effective load in kilograms (lbs.) placed on the glass by the formers as the RPM are increased.

TABLE

| Time (min.) | RPM | Load kgs/lbs |
|---|---|---|
| 0 | 150 | 6.31/2.87 |
| 15 | 315 | 27.9/12.7 |
| 20 | 500 | 70/32 |
| 25 | 650 | 117/54 |
| 30 | 850 | 202/92 |
| 32 | — | — |

At the end of 30 minutes the blank had conformed to the mold. Rotation of the mold was stopped, the assembly cooled, and the lens removed. At this point, the lens was temporarily polarizing, that is, the lens was capable of polarizing light only when the lens was in the darkened state.

This temporary condition was rendered permanent, that is, capable of polarizing light regardless of whether the glass was darkened or faded. This was accomplished by firing the lens in hydrogen for 30 minutes at 400° C. The resulting lens was permanently polarizing across the entire visible portion of the spectrum.

We claim:

1. An ophthalmic lens of photochromic glass having an $R_2O$-$Al_2O_3$-$B_2O_3$-$SiO_2$ base glass composition, the lens containing precipitated cuprous halide crystals that are elongated and oriented, whereby the lens, in the darkened state, exhibits dichroic behavior and provides polarization of radiation across the entire visible wavelength region of the spectrum, the lens having a sharp spectral cutoff for radiation below the 400 nm wavelength, thereby eliminating UV transmission, the lens having a transmittance not over about 40% in the darkened state and a ratio of phase shift due to birefringence that is not less than about 0.7.

2. An ophthalmic lens in accordance with claim 1 wherein at least a portion of the crystals in at least a surface layer on the lens are reduced to copper metal, whereby the lens exhibits a permanent dichroic behavior.

3. An ophthalmic glass lens in accordance with claim 2 wherein the glass has a composition that includes 0.2–2.0 weight percent copper calculated as $Cu_2O$ and 0.25–1.5% of a halogen selected from the group consisting of bromine, chlorine and mixtures thereof.

4. An ophthalmic glass lens in accordance with claim 2 wherein the glass has a composition that includes 0.4–1.0% $Cu_2O$, 0.4–1.0% SnO and 0.25–1.5% of a halogen selected from the group consisting of 0.25–1.0% Cl, 0.25–1.0% Br and 0.25–1.5% of mixtures therefore.

5. An ophthalmic glass lens in accordance with claim 2 wherein the glass has a composition that consists essentially of, as calculated from the glass batch in weight percent on an oxide and halogen basis; 40–75% $SiO_2$, 4–26% $B_2O_3$, 4–26% $Al_2O_3$, 0–8% $Li_2O$, 0–15% $Na_2O$, 0–20% $K_2O$, the total $Li_2O$+$Na_2O$+$K_2O$ being 2–20%, 0–10% CaO+BaO+SrO, 0.2–2% $Cu_2O$, 0–2% CdO, 0–12% $ZrO_2$, 0–2.5% $SnO_2$, 0–2% $As_2O_3$+$Sb_2O_3$, 0–2% Cl, 0–2% Br, 0.25–2.0% Cl+Br, 0–2% F, with an R-value in the range of 0.15–0.45.

6. An ophthalmic glass lens in accordance with claim 2 having a 6 diopter curvature.

7. An ophthalmic lens in accordance with claim 1 wherein the lens is a reformed blank having a curved surface.

* * * * *